United States Patent
Isoi

(10) Patent No.: US 12,061,178 B2
(45) Date of Patent: Aug. 13, 2024

(54) LIQUID CHROMATOGRAPH AND LIQUID AMOUNT DETECTION METHOD

(71) Applicant: SHIMADZU CORPORATION, Kyoto (JP)

(72) Inventor: Takuya Isoi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 97 days.

(21) Appl. No.: 16/648,303

(22) PCT Filed: Sep. 19, 2017

(86) PCT No.: PCT/JP2017/033755
§ 371 (c)(1),
(2) Date: Mar. 18, 2020

(87) PCT Pub. No.: WO2019/058433
PCT Pub. Date: Mar. 28, 2019

(65) Prior Publication Data
US 2020/0264139 A1    Aug. 20, 2020

(51) Int. Cl.
*G01N 30/34* (2006.01)
*G01N 30/02* (2006.01)

(52) U.S. Cl.
CPC ....... *G01N 30/34* (2013.01); *G01N 2030/027* (2013.01)

(58) Field of Classification Search
CPC ............. G01N 30/34; G01N 2030/027; G01N 2030/8804; G01N 30/26
See application file for complete search history.

(56) References Cited

U.S. PATENT DOCUMENTS

| 6,315,901 B1 * | 11/2001 | Okada ................... G01N 30/34 |
| | | 210/198.2 |
| 2012/0074214 A1 | 3/2012 | Mizumoto et al. |
| 2014/0096603 A1 * | 4/2014 | Nichols .................. G01F 23/30 |
| | | 73/305 |

FOREIGN PATENT DOCUMENTS

| CN | 102171561 B * | 11/2014 | .......... G01F 23/292 |
| JP | 10-232234 A | 9/1998 | |

(Continued)

OTHER PUBLICATIONS

International Search Report for PCT/JP2017/033755 dated Nov. 28, 2017 [PCT/ISA/210].

(Continued)

*Primary Examiner* — Kristina M Deherrera
*Assistant Examiner* — Gedeon M Kidanu
(74) *Attorney, Agent, or Firm* — Sughrue Mion, PLLC

(57) ABSTRACT

A liquid chromatograph 1 includes a weight measuring device 21 and a control device 30. The control device 30 includes a liquid amount detection processor 301. The weight measuring device 21 measures the weight of the first mobile phase container 6, the second mobile phase container 8, or the waste liquid container 13. The liquid amount detection processor 301 detects the amount of the mobile phase or the amount of the waste liquid based on the weight measured by the weight measuring device 21. For this reason, the amount of the mobile phase or the amount of the waste liquid can be detected without providing a flow sensor or the like in a channel. As a result, the delivery of the mobile phase can be kept in a smooth state. Further, even in a case where a problem occurs in the channel of the mobile phase, the first pump 7, and the second pump 9, the amount of the mobile phase or the amount of the waste liquid can be detected. Furthermore, the amount of the mobile phase or the amount of the waste liquid can be detected without being (Continued)

affected by the shape of each container. For this reason, the amount of the mobile phase or the amount of the waste liquid can be accurately detected.

12 Claims, 5 Drawing Sheets

(56) References Cited

FOREIGN PATENT DOCUMENTS

| JP | 2000-298122 | A |   | 10/2000 | | |
|----|-------------|---|---|---------|---|---|
| JP | 2002277451  | A | * | 9/2002  | | |
| JP | 2007-040811 | A |   | 2/2007  | | |
| JP | 2007040811  | A | * | 2/2007  | | |
| JP | 2008203157  | A | * | 9/2008  | | |
| JP | 4778748     | B2 | * | 9/2011 | | |
| JP | 2012-073164 | A |   | 4/2012  | | |
| JP | 2012073164  | A | * | 4/2012  | ....... | G01N 35/00663 |
| JP | 2014-014428 | A |   | 1/2014  | | |
| JP | 2014014428  | A | * | 1/2014  | | |
| JP | 2015-059895 | A |   | 3/2015  | | |
| JP | 2015059895  | A | * | 3/2015  | | |

OTHER PUBLICATIONS

Written Opinion for PCT/JP2017/033755 dated Nov. 28, 2017 [PCT/ISA/237].
Communication issued Jan. 4, 2022 from the China National Intellectual Property Administration in Chinese Application No. 201780094988.4.
Office Action issued Jun. 21, 2022 in Chinese Application No. 201780094988.4.
Communication dated Jan. 28, 2023 from The State Intellectual Property Office of P.R. of China in Application No. 201780094988.4.
Office Action issued Jul. 31, 2023 in Chinese Application No. 201780094988.4.

* cited by examiner

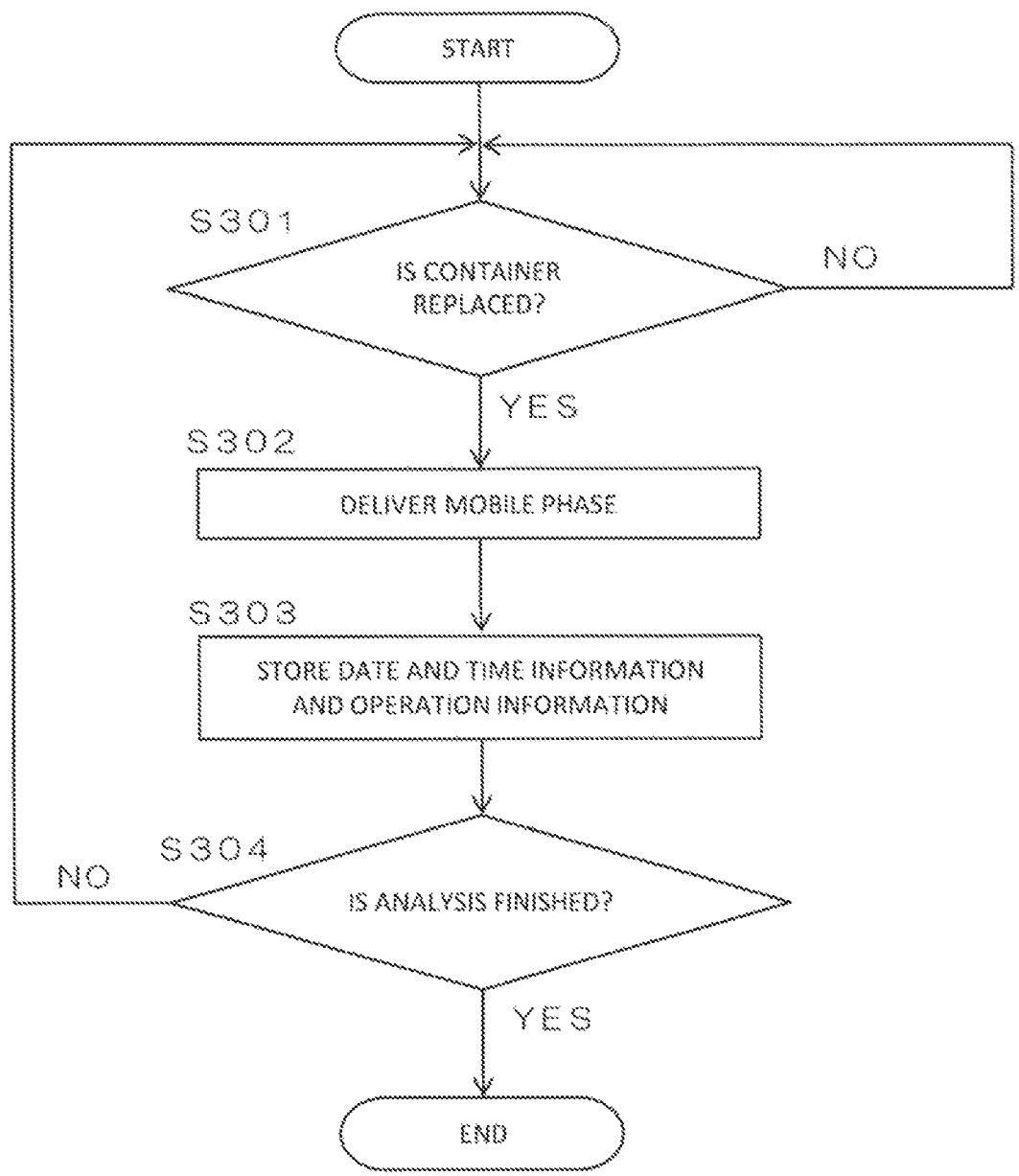

LIQUID CHROMATOGRAPH AND LIQUID AMOUNT DETECTION METHOD

CROSS REFERENCE TO RELATED APPLICATIONS

This application is a National Stage of International Application No. PCT/JP2017/033755 filed Sep. 19, 2017.

TECHNICAL FIELD

The present invention relates to a liquid chromatograph that delivers a mobile phase contained in a mobile phase container into a column, separates a sample in the column, and collects a mobile phase that has passed through the column into a waste liquid container, and a liquid amount detection method in the liquid chromatograph.

BACKGROUND ART

The liquid chromatograph includes a storage device for storing a mobile phase, a sample introduction device, a separation column, and a detector. In the liquid chromatograph, a mobile phase in the storage device is delivered to the separation column at a constant flow rate. Then, a sample is injected into the delivered mobile phase via the sample introduction device, and a sample component contained in the mobile phase is temporally separated in the separation column. The separated sample component is detected by the detector.

When analysis operation is repeatedly performed in the liquid chromatograph, an amount of the mobile phase gradually decreases. If analysis operation is performed in a liquid chromatograph in a state where the mobile phase is insufficient, there may be a case where a correct analysis result is not obtained. In order to solve such a problem, a liquid chromatograph for detecting an amount (remaining amount) of a mobile phase has been proposed (for example, see Patent Document 1 below).

The liquid chromatograph described in Patent Document 1 stores an amount (set amount) of the mobile phase set when the liquid chromatograph is replenished with the mobile phase, and calculates an integrated amount of the delivered mobile phase. Then, the remaining amount of the mobile phase is calculated by subtracting the integrated amount of the delivered mobile phase from the stored set amount. Further, in the liquid chromatograph, a warning is displayed when the calculated remaining amount of the mobile phase is less than a predetermined amount. In this manner, in the liquid chromatograph, it is possible to suppress the analysis operation from being performed in a state where the mobile phase is insufficient.

PRIOR ART DOCUMENT

Patent Document

Patent Document 1: Japanese Patent Laid-Open No. 2000-298122

SUMMARY OF THE INVENTION

Problems to be Solved by the Invention

However, in the conventional liquid chromatograph as described above, there have been a problem that performance of delivery of the mobile phase may be deteriorated and a problem that there is a case where the remaining amount of the mobile phase cannot be accurately detected.

Specifically, the conventional liquid chromatograph sometimes uses a configuration, in which, for example, a flow sensor is provided in a channel of a mobile phase, and an integrated amount of the delivered mobile phase is calculated based on a detection result of the flow sensor. In the case of such a configuration, the flow sensor provided in the channel affects the flow of the mobile phase, and thus there is a possibility that the performance of the delivery of the mobile phase is reduced.

Further, the conventional liquid chromatograph sometimes uses a configuration, in which, for example, a feeding amount of a liquid feed pump that delivers the mobile phase is detected, and an integrated amount of the delivered mobile phase is calculated based on a result of the detection. In such a configuration, in a case where a problem occurs in the channel of the mobile phase or the liquid feed pump, the integrated amount of the delivered mobile phase is sometimes not accurately calculated.

Further, the conventional liquid chromatograph sometimes uses a configuration, in which, for example, a liquid level detection sensor that detects a position of a liquid level of the mobile phase is provided, and an integrated amount of the delivered mobile phase is calculated based on a detection result of the liquid level detection sensor. In such a configuration, in a case where a shape of the container storing the mobile phase has a large horizontal cross-sectional area or broadens toward the end, the integrated amount of the delivered mobile phase sometimes cannot be accurately calculated.

The present invention has been made in view of the above-described circumstances, and an object of the present invention is to provide a liquid chromatograph capable of keeping delivery of a mobile phase in a smooth state and capable of accurately detecting an amount of the mobile phase or an amount of waste liquid, and a liquid amount detection method.

Means for Solving the Problems (1) A liquid chromatograph according to the present invention delivers a mobile phase contained in a mobile phase container into a column, separates a sample in the column, and collects a mobile phase that has passed through the column into a waste liquid container. The liquid chromatograph includes a weight measuring device and a liquid amount detection processor. The weight measuring device measures the weight of the mobile phase container or the waste liquid container. The liquid amount detection processor detects the amount of the mobile phase in the mobile phase container or the amount of the waste liquid in the waste liquid container based on the weight measured by the weight measuring device.

According to such a configuration, the weight of the mobile phase container or the waste liquid container can be measured, and the amount of the mobile phase or the amount of waste liquid can be detected based on the weight.

For this reason, the amount of the mobile phase or the amount of the waste liquid can be detected without providing a flow sensor or the like in a channel.

As a result, the delivery of the mobile phase can be kept in a smooth state.

Further, even in a case where a problem occurs in the channel of the mobile phase or the liquid feed pump, the amount of the mobile phase or the amount of the waste liquid can be detected. Furthermore, the amount of the mobile phase or the amount of the waste liquid can be detected without being affected by the shape of the mobile phase container or the shape of the waste liquid container.

For this reason, the amount of the mobile phase or the amount of the waste liquid can be accurately detected.

(2) Further, the liquid chromatograph may further include a container replacement detection processor. The container replacement detection processor detects that the mobile phase container or the waste liquid container is replaced based on the weight measured by the weight measuring device.

According to such a configuration, the replacement of the mobile phase container or the waste liquid container can be detected with a simple configuration.

(3) Further, the liquid chromatograph may further include a liquid delivery processor. The liquid delivery processor delivers a mobile phase in the mobile phase container in a case where replacement of the mobile phase container is detected by the container replacement detection processor.

According to such a configuration, the mobile phase can be automatically delivered in response to the replacement of the mobile phase container. Then, by causing a new mobile phase to flow through the channel, the channel can be cleaned.

For this reason, the operation of cleaning the channel can be automated.

(4) Further, the liquid chromatograph may further include a notification processor. The notification processor performs notification based on a detection result obtained by the liquid amount detection processor.

According to such a configuration, it is possible to make the user surely recognize the detection result obtained by the liquid amount detection processor.

(5) Further, the liquid chromatograph may further include a stop processor. The stop processor stops the operation of the liquid chromatograph based on the detection result obtained by the liquid amount detection processor.

According to such a configuration, the operation of the liquid chromatograph can be stopped in a case where the liquid chromatograph is not in a state suitable for performing the analysis operation, for example, in a case where the amount of the mobile phase is insufficient or the amount of the waste liquid is large, as a result of the detection performed by the liquid amount detection processor.

(6) Further, the liquid chromatograph may further include a history storage processor. The history storage processor stores information indicating that the mobile phase container or the waste liquid container is replaced and date and time information of the replacement as a history in a storage device, in a case where the container replacement detection processor detects replacement of the mobile phase container or the waste liquid container.

According to such a configuration, the fact that the mobile phase container or the waste liquid container is replaced and the date and time of replacement of each container can be stored as a history.

For this reason, information on the replacement of the mobile phase container or the waste liquid container can be appropriately managed.

(7) Further, the liquid chromatograph may further include a history storage processor. The history storage processor stores information indicating occurrence of shortage of a mobile phase and date and time information of the occurrence of shortage as a history in a storage device, in a case where an amount of a mobile phase in the mobile phase container detected by the liquid amount detection processor is less than a first threshold.

According to such a configuration, the fact that the amount of the mobile phase is less than the first threshold and the date and time of the occurrence of the shortage of the mobile phase can be stored as a history.

For this reason, information on the amount of the mobile phase can be appropriately managed.

(8) Further, the liquid chromatograph may further include a history storage processor. The history storage processor stores information indicating occurrence of excess of waste liquid and date and time information of the occurrence of excess of the waste liquid as a history in a storage device, in a case where an amount of the waste liquid in the waste liquid container detected by the liquid amount detection processor is equal to or more than a second threshold.

According to such a configuration, the fact that the amount of the waste liquid becomes equal to or more than the second threshold and the date and time of the occurrence of excess of the waste liquid can be stored as a history.

For this reason, information on the amount of the waste liquid can be appropriately managed.

(9) A liquid amount detection method according to the present invention is a liquid amount detection method in a liquid chromatograph that delivers a mobile phase contained in a mobile phase container into a column, separates a sample in the column, and collects a mobile phase that has passed through the column into a waste liquid container. The liquid amount detection method includes a weight measuring step and a liquid amount detecting step. In the weight measuring step, the weight of the mobile phase container or the waste liquid container is measured. In the liquid amount detecting step, the amount of the mobile phase in the mobile phase container or the amount of the waste liquid in the waste liquid container is detected based on the weight measured in the weight measuring step.

Effects of the Invention

According to the present invention, the weight of a mobile phase container or a waste liquid container can be measured, and the amount of the mobile phase or the amount of waste liquid in the waste liquid container can be detected based on the weight. For this reason, the amount of the mobile phase or the amount of waste liquid in the waste liquid container can be detected without providing a flow sensor in a channel. As a result, the delivery of the mobile phase can be kept in a smooth state. Further, even in a case where a problem occurs in the channel of the mobile phase or the liquid feed pump, the amount of the mobile phase or the amount of the waste liquid in the waste liquid container can be detected. Furthermore, the amount of the mobile phase or the amount of the waste liquid in the waste liquid container can be detected without being affected by the shape of the mobile phase container or the shape of the waste liquid container. For this reason, the amount of the mobile phase or the amount of the waste liquid can be accurately detected.

BRIEF DESCRIPTION OF THE DRAWINGS

FIG. 5 is a flowchart showing a third example of the control operation by the control device.

MODE FOR CARRYING OUT THE INVENTION

1. Overall Configuration of Liquid Chromatograph

Figure 1:
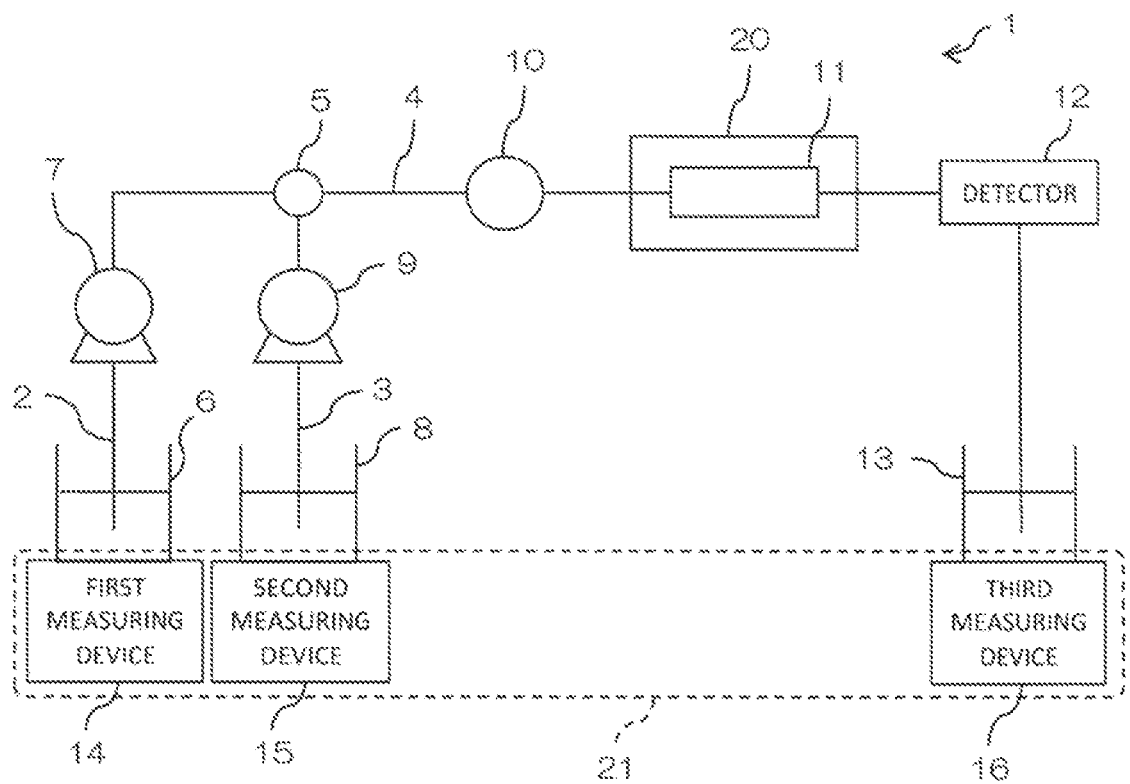
FIG. 1 is a schematic diagram showing a configuration example of a liquid chromatograph according to one embodiment of the present invention.

FIG. 1 is a schematic diagram showing a configuration example of a liquid chromatograph 1 according to one embodiment of the present invention.

The liquid chromatograph 1 includes a channel 2, a channel 3, and a channel 4. A downstream end of the channel 2 and a downstream end of the channel 3 join via a mixer 5. An upstream end of the channel 4 is connected to the mixer 5. In the channel 2, a first mobile phase container 6 and a first pump 7 are arranged. In the channel 3, a second mobile phase container 8 and a second pump 9 are arranged. In the channel 3, a sample introduction device 10, a separation column 11, a detector 12, and a waste liquid container 13 are arranged in this order in an inflow direction.

An upstream end of the channel 2 is inserted into the first mobile phase container 6. In the first mobile phase container 6, liquid serving as a mobile phase is stored. The first mobile phase container 6 is placed on a first measuring device 14. The first measuring device 14 is configured to measure the weight of a placed member (the first mobile phase container 6).

An upstream end of the channel 3 is inserted into the second mobile phase container 8. In the second mobile phase container 8, a mobile phase of a type different from that of the mobile phase of the first mobile phase container 6 is stored. The second mobile phase container 8 is placed on a second measuring device 15. The second measuring device 15 is configured to measure the weight of a placed member (the second mobile phase container 8). The first mobile phase container 6 and the second mobile phase container 8 constitute an example of a mobile phase container.

The sample introduction device 10 is, for example, an autosampler.

The separation column 11 is housed in a column oven 20 and heated.

The detector 12 detects a sample component separated by the separation column 11.

A downstream end of the channel 4 is inserted into the waste liquid container 13. A mobile phase (waste liquid) after passing through the separation column 11 flows into the waste liquid container 13. The waste liquid container 13 is placed on a third measuring device 16. The third measuring device 16 is configured to measure the weight of a placed member (the waste liquid container 13). The first measuring device 14, the second measuring device 15, and the third measuring device 16 constitute a weight measuring device 21.

In the liquid chromatograph 1, the mobile phase is sent out from the first mobile phase container 6 by the operation of the first pump 7. Further, the mobile phase is sent out from the second mobile phase container 8 by the operation of the second pump 9. Then, these mobile phases are mixed by the mixer 5, and the mixed mobile phase flows in the channel 4. Further, a sample is injected into the channel 4 from the sample introduction device 10. The sample is carried to the separation column 11 by the mobile phase, separated into components, and then introduced into the detector 12. Then, the detector 12 detects the sample component.

In the liquid chromatograph 1, when such analysis operation is performed, an amount (remaining amount) of the mobile phase in the first mobile phase container 6, an amount (remaining amount) of the mobile phase in the second mobile phase container 8, and an amount of waste liquid in the waste liquid container 13 are detected based on weights measured by the weight measuring device 21.

2. Electrical Configuration of Control Device and Members Around Control Device

Figure 2:
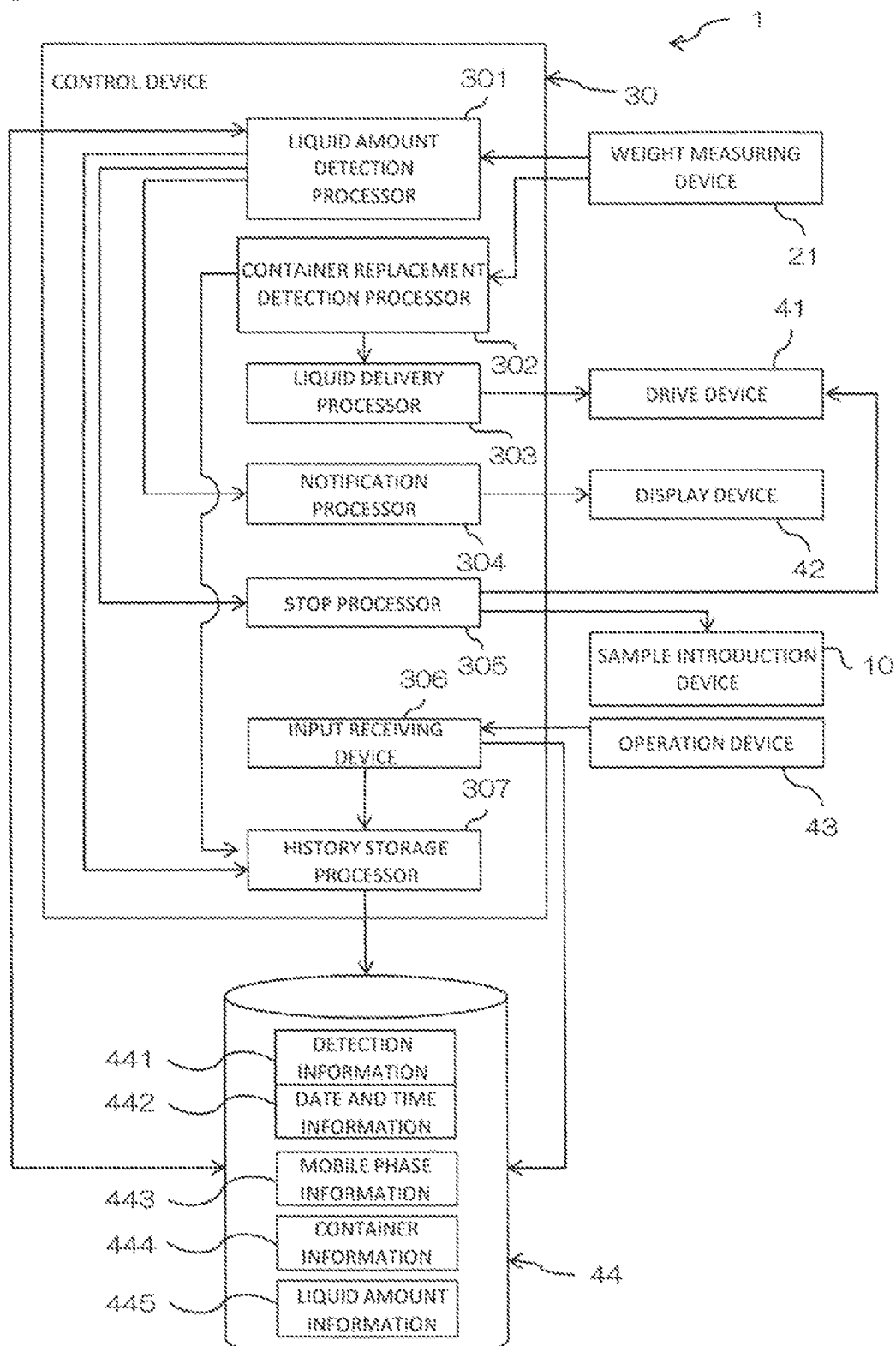
FIG. 2 is a block diagram showing an electrical configuration of a control device and members around the control device.

FIG. 2 is a block diagram showing an electrical configuration of a control device 30 and members around the control device 30.

The liquid chromatograph 1 includes a drive device 41, a display device 42, an operation device 43, a storage device 44, the control device 30, and the like, in addition to the sample introduction device 10 and the weight measuring device 21 described above.

The drive device 41 operates the first pump 7 and the second pump 9 by applying a driving force to each of them.

The display device 42 is configured with, for example, a liquid crystal display and the like.

The operation device 43 has a configuration including, for example, a keyboard and a mouse. The user can perform input operation by operating the operation device 43.

The storage device 44 includes, for example, a read only memory (ROM), a random access memory (RAM), a hard disk, and the like. The storage device 44 stores detection information 441, date and time information 442, mobile phase information 443, container information 444, and liquid amount information 445. As will be described later in detail, these pieces of information are stored in the storage device 44 by the control device 30 as needed.

The detection information 441 is information on a detection result by a liquid amount detection processor 301 and a container replacement detection processor 302 (described later).

The date and time information 442 is information including information on the date and time when predetermined detection is performed by the liquid amount detection processor 301 and information on the date and time when predetermined detection is performed by the container replacement detection processor 302. The date and time information 442 is associated with the detection information 441.

The mobile phase information 443 is information on a type of a mobile phase stored in each of the first mobile phase container 6 and the second mobile phase container 8.

The container information 444 is information on the weight of each of the first mobile phase container 6 and the second mobile phase container 8.

The liquid amount information 445 is information on the liquid amount of the mobile phase in the first mobile phase container 6, the liquid amount of the mobile phase in the second mobile phase container 8, and the liquid amount of the waste liquid in the waste liquid container 13.

The control device 30 is configured to include, for example, a central processing unit (CPU). The sample introduction device 10, the weight measuring device 21, the drive device 41, the display device 42, the operation device 43, the storage device 44, and the like are electrically connected to the control device 30. As the CPU executes a program, the control device 30 functions as the liquid amount detection processor 301, the container replacement detection processor 302, a liquid delivery processor 303, a notification processor 304, a stop processor 305, an input receiving device 306, a history storage processor 307, and the like.

The liquid amount detection processor 301 detects the liquid amount of the mobile phase in the first mobile phase container 6, the liquid amount of the mobile phase in the second mobile phase container 8, or the liquid amount of the waste liquid in the waste liquid container 13 based on the weight measured by the weight measuring device 21 (the weight of the first mobile phase container 6, the weight of the second mobile phase container 8, or the weight of the waste liquid container 13).

The container replacement detection processor 302 detects that the first mobile phase container 6, the second mobile phase container 8, or the waste liquid container 13 is replaced based on the weight measured by the weight measuring device 21 (the weight of the first mobile phase container 6, the weight of the second mobile phase container 8, or the weight of the waste liquid container 13).

The liquid delivery processor 303 controls the operation of the first pump 7 and the second pump 9 by controlling the drive of the drive device 41 based on a detection result obtained by the container replacement detection processor 302.

The notification processor 304 performs processing of displaying notification on the display device 42 based on the detection result obtained by the liquid amount detection processor 301.

The stop processor 305 performs processing of stopping the operation of the drive device 41 (the operation of the first pump 7 and the second pump 9) and the operation of the sample introduction device 10 based on the detection result obtained by the liquid amount detection processor 301.

The input receiving device 306 receives input of various pieces of information based on the operation of the operation device 43 by the user. Part of the information received by the input receiving device 306 is stored in the storage device 44.

The history storage processor 307 stores information related to detection by the liquid amount detection processor 301 and the container replacement detection processor 302 and information on date and time in the storage device 44 based on the detection result obtained by the liquid amount detection processor 301 or the detection result obtained by the container replacement detection processor 302.

3. Control Operation of Control Device (1) Control Before Analysis Starts

First, the liquid chromatograph 1 is maintained in a setting state for inputting various types of basic information as the user operates the operation device 43. In this state, the first mobile phase container 6, the second mobile phase container 8, and the waste liquid container 13 in a state of containing no liquid inside are respectively placed on the first measuring device 14, the second measuring device 15, and the third measuring device 16.

Then, the liquid amount detection processor 301 measures the weight of each of the first mobile phase container 6, the second mobile phase container 8, and the waste liquid container 13 (weight in an empty state). Information on the weights of the first mobile phase container 6, the second mobile phase container 8, and the waste liquid container 13 measured by the liquid amount detection processor 301 is stored in the storage device 44 as the container information 444.

Further, the user operates the operation device 43 to input a type of the mobile phase to be injected into the first mobile phase container 6 and a type of the mobile phase to be injected into the second mobile phase container 8. Upon receiving the above input, the input receiving device 306 stores the information on the received mobile phase as the mobile phase information 443 in the storage device 44. For example, the storage device 44 stores in advance information relating to a plurality of types of mobile phases (information on the specific gravity and the like), and associates this information with the mobile phase information 443.

Further, the user lifts the first mobile phase container 6 from the first measuring device 14 and injects the mobile phase into the first mobile phase container 6. Then, when the mobile phase is stored in the first mobile phase container 6 in a full state, the user places the first mobile phase container 6 in that state on the first measuring device 14. Similarly, the user lifts the second mobile phase container 8 from the second measuring device 15 and injects the mobile phase into the second mobile phase container 8. Then, when the mobile phase is stored in the second mobile phase container 8 in a full state, the user places the second mobile phase container 8 in that state on the second measuring device 15. By such operation, the weight measured by each measuring device changes so as to decrease once and then increase.

The liquid amount detection processor 301 detects the amount of each mobile phase in a full state based on the weight measured by the weight measuring device 21 and the mobile phase information 443 and the container information 444 in the storage device 44.

Specifically, the liquid amount detection processor 301 uses the information of the container information 444 (the weight of the first mobile phase container 6) as a reference value, and extracts the maximum value of the weight measured by the first measuring device 14 as the weight measured by the first measuring device 14 becomes once less than the reference value and then becomes more than the reference value. Then, the liquid amount detection processor 301 detects the weight of the mobile phase in the first mobile phase container 6 by subtracting the reference value (the weight of the first mobile phase container 6) from the extracted value. Furthermore, the liquid amount detection processor 301 detects (calculates) an amount of the mobile phase in the first mobile phase container 6 by, for example, using information of the specific gravity, based on the detected weight and the information of the mobile phase information 443 (information of the type of the mobile phase in the first mobile phase container 6). The detected information on the amount of the mobile phase in the first mobile phase container 6 is stored in the storage device 44 as the liquid amount information 445. That is, at this time, the information stored in the storage device 44 as the liquid amount information 445 is information on the liquid amount of the mobile phase stored in the first mobile phase container 6 in a full state.

Similarly, the liquid amount detection processor 301 uses the information of the container information 444 (the weight of the second mobile phase container 8) as a reference value, and extracts the maximum value of the weight measured by the second measuring device 15 as the weight measured by the second measuring device 15 becomes once less than the reference value and then becomes more than the reference value. Then, the liquid amount detection processor 301 detects the weight of the mobile phase in the second mobile phase container 8 by subtracting the reference value (the weight of the second mobile phase container 8) from the extracted value. Furthermore, the liquid amount detection processor 301 detects (calculates) an amount of the mobile phase in the second mobile phase container 8 by, for example, using information of the specific gravity, based on the detected weight and the information of the mobile phase information 443 (information of the type of the mobile phase in the second mobile phase container 8). The detected information on the amount of the mobile phase in the second mobile phase container 8 is stored in the storage device 44 as the liquid amount information 445. That is, at this time, the information stored in the storage device 44 as the liquid amount information 445 is information on the liquid amount of the mobile phase stored in the second mobile phase container 8 in a full state.

(2) Control During Analysis Operation

Figure 3:
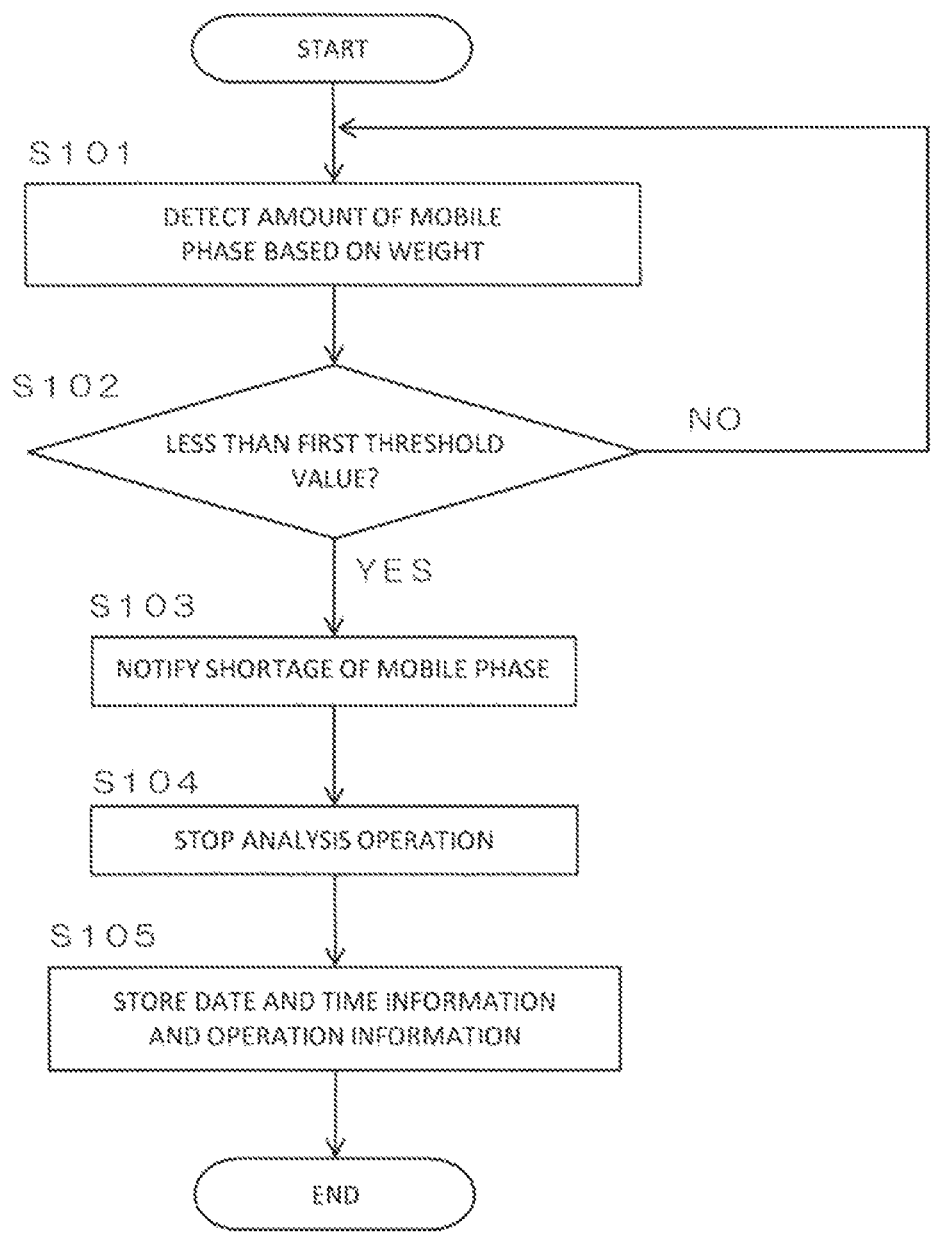
FIG. 3 is a flowchart showing a first example of control operation by the control device.
Figure 4:
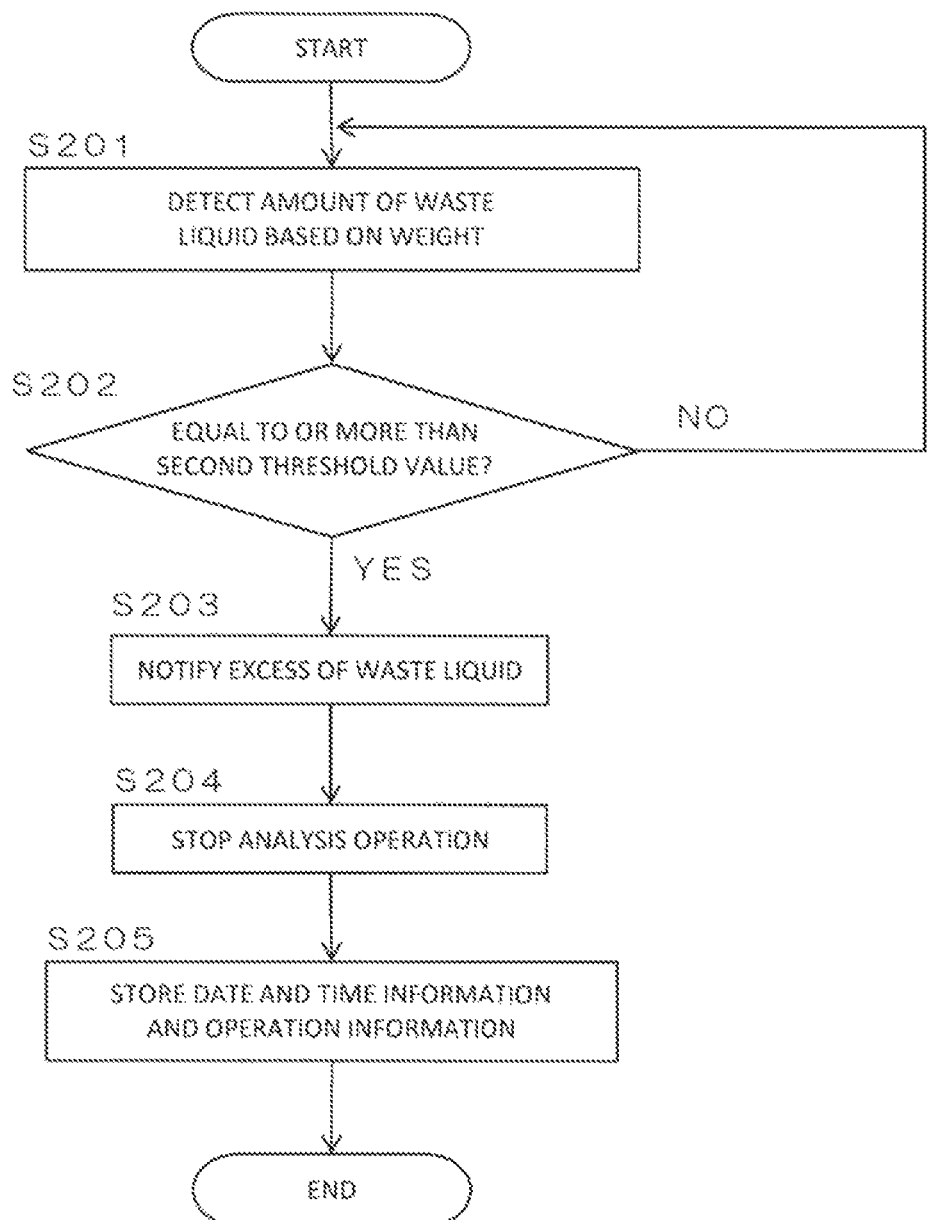
FIG. 4 is a flowchart showing a second example of the control operation by the control device.

Hereinafter, the control operation of the control device 30 during analysis operation will be described with reference to FIGS. 3 to 5. FIG. 3 is a flowchart showing a first example of the control operation by the control device 30. FIG. 4 is a flowchart showing a second example of the control operation by the control device 30. FIG. 5 is a flowchart showing a third example of the control operation by the control device 30.

(2-1) Control Operation Accompanying Decrease in Mobile Phase

When the analysis operation is started in the liquid chromatograph 1, the liquid delivery processor 303 drives the drive device 41 to operate each of the first pump 7 and the second pump 9. In this manner, the mobile phase in the first mobile phase container 6 flows into the channel 2 and the mobile phase in the second mobile phase container 8 flows into the channel 3. Then, these mobile phases are mixed by the mixer 5 and then flow into the channel 4, pass through the separation column 11, and flow into the waste liquid container 13.

In this manner, during the analysis operation in the liquid chromatograph 1, the amount of the mobile phase in the first mobile phase container 6 and the amount of the mobile phase in the second mobile phase container 8 decrease, and the amount of the waste liquid in the waste liquid container 13 increases.

Then, the liquid amount detection processor 301 detects the amount of each mobile phase based on the weight measured by the weight measuring device 21 and the mobile phase information 443 and the container information 444 in the storage device 44 (Step S101).

Specifically, the liquid amount detection processor 301 uses the information of the container information 444 (the weight of the first mobile phase container 6) as a reference value, and subtracts the reference value (the weight of the first mobile phase container 6) from the weight measured by the first measuring device 14, so as to detect (measure) the weight of the mobile phase in the first mobile phase container 6 (weight measuring step). Furthermore, the liquid amount detection processor 301 detects (calculates) an amount (remaining amount) of the mobile phase in the first mobile phase container 6 by, for example, using information of the specific gravity, based on the detected weight and the information of the mobile phase information 443 (information of the type of the mobile phase in the first mobile phase container 6).

Similarly, the liquid amount detection processor 301 uses the information of the container information 444 (the weight of the second mobile phase container 8) as a reference value, and subtracts the reference value (the weight of the second mobile phase container 8) from the weight measured by the second measuring device 15, so as to detect the weight of the mobile phase in the second mobile phase container 8. Furthermore, the liquid amount detection processor 301 detects (calculates) an amount (remaining amount) of the mobile phase in the second mobile phase container 8 by, for example, using information of the specific gravity, based on the detected weight and the information of the mobile phase information 443 (information of the type of the mobile phase in the second mobile phase container 8).

In a case where the amount (remaining amount) of each mobile phase detected by the liquid amount detection processor 301 becomes less than a first threshold which is a predetermined set amount, or less than a mobile phase amount estimated to be used calculated from setting (method) at the time of the analysis operation before the start of the analysis (YES in Step S102), the notification processor 304 causes the display device 42 to display that the mobile phase is insufficient (Step S103). Further, the stop processor 305 stops the analysis operation by stopping the drive of the drive device 41 and stopping the operation of the sample introduction device 10 (the analysis operation is not performed if the analysis is not started) (Step S104). Note that there may be a function for inquiring the user whether to stop or continue the operation when the mobile phase is determined to be insufficient.

Then, in response to the amount of each mobile phase detected by the liquid amount detection processor 301 becoming less than the first threshold, the history storage processor 307 stores information indicating the occurrence of shortage of the mobile phase and information on the date and time of the shortage in the storage device 44 as a history as the detection information 441 and the date and time information 442 associated with each other (Step S105). Note that, at this time, execution of the analysis operation stop shown in Step S104 and details of the stop (for example, when a stop command is issued, when the operation is actually stopped, whether the user has selected stop or continue, and so on) may be stored in the storage device 44.

In this manner, the control device 30 performs control operation associated with decrease in the mobile phase in the first mobile phase container 6 and decrease in the mobile phase in the second mobile phase container 8.

(2-2) Control Operation Accompanying Increase of Waste Liquid

Further, the liquid amount detection processor 301 detects the amount of waste liquid based on the weight measured by the weight measuring device 21 and the container information 444 in the storage device 44 (Step S201).

Specifically, the liquid amount detection processor 301 uses the information of the container information 444 (the weight of the waste liquid container 13) as a reference value, and subtracts the reference value (the weight of the waste liquid container 13) from the weight measured by the third measuring device 16, so as to detect the weight of the waste liquid in the waste liquid container 13. At this time, the liquid amount detection processor 301 detects (calculates) the amount of the waste liquid in the waste liquid container 13 from the detected weight and the information of the mobile phase information 443.

In a case where the amount of the waste liquid detected by the liquid amount detection processor 301 becomes equal to or more than a second threshold which is a predetermined set amount, or in a case where a value obtained by adding a mobile phase amount estimated to be used calculated from setting (method) at the time of the analysis operation before the start of the analysis to a current value becomes equal to or more than the second threshold (YES in Step S202), the notification processor 304 causes the display device 42 to display that the amount of the waste liquid is excessive (the waste liquid is excessive) (Step S203). Further, the stop processor 305 stops the analysis operation by stopping the drive of the drive device 41 and stopping the operation of the sample introduction device 10 (the analysis operation is not performed if the analysis is not started) (Step S204). Note that there may be a function for inquiring the user whether to stop or continue the operation when the waste liquid is determined to be excessive or expected to be excessive.

Then, in response to the amount of the waste liquid detected by the liquid amount detection processor 301 becoming equal to or more than the second threshold, the history storage processor 307 stores information indicating the occurrence of an excess of the waste liquid and information on the date and time of the excess in the storage device 44 as a history as the detection information 441 and the date and time information 442 associated with each other (Step S205). Note that, at this time, execution of the analysis operation stop shown in Step S204 and details of the stop (for example, when a stop command is issued, when the operation is actually stopped, whether the user has selected stop or continue, and so on) may be stored in the storage device 44.

In this manner, the control device 30 performs control operation accompanying increase in the waste liquid in the waste liquid container 13.

(2-3) Control Operation Accompanying Container Replacement

In the liquid chromatograph 1, when the mobile phase of the first mobile phase container 6 or the second mobile phase container 8 is reduced, the user lifts a container (the first mobile phase container 6 or the second mobile phase container 8) to which the mobile phase is to be added, and injects the mobile phase into the container. Then, when the mobile phase is stored in the container in a full state, the user places the container in that state on the first measuring device 14 or the second measuring device 15 again. By such operation, the weight measured by the first measuring device 14 or the second measuring device 15 is changed so as to decrease once and then increase.

The container replacement detection processor 302 uses the information of the container information 444 as a reference value and detects that each container is replaced based on the weight measured by each measuring device (YES in Step S301).

Specifically, the container replacement detection processor 302 uses the information of the container information 444 (the weight of the first mobile phase container 6) as a reference value, and detects that the first mobile phase container 6 is replaced as the weight measured by the first measuring device 14 becomes once less than the reference value and then becomes more than the reference value. Then, the information on the liquid amount of the mobile phase in the first mobile phase container 6 detected by the liquid amount detection processor 301 is rewritten as (updated to) the new liquid amount information 445 and stored in the storage device 44.

Further, the container replacement detection processor 302 uses the information of the container information 444 (the weight of the second mobile phase container 8) as a reference value, and detects that the second mobile phase container 8 is replaced as the weight measured by the second measuring device 15 becomes once less than the reference value and then becomes more than the reference value. Then, the information on the liquid amount of the mobile phase in the second mobile phase container 8 detected by the liquid amount detection processor 301 is rewritten as (updated to) the new liquid amount information 445 and stored in the storage device 44.

Note that the configuration may be such that a light emitting element and a light receiving element (light sensor) are installed in each mobile phase container, so that light from the light emitting element hits the light receiving element when there is no container, and the light is blocked when there is a container. Then, the replacement of the container may be detected by monitoring the state of the light receiving element.

The liquid delivery processor 303 drives the drive device 41 in response to the replacement of the first mobile phase container 6 or the second mobile phase container 8 detected by the container replacement detection processor 302, and causes each of the first pump 7 and the second pump 9 to be operated for a predetermined time. In this manner, the mobile phase in the first mobile phase container 6 flows into the channel 2 and the mobile phase in the second mobile phase container 8 flows into the channel 3 (Step S302). Then, these mobile phases are mixed by the mixer 5 and then flow into the channel 4, pass through the separation column 11, and flow into the waste liquid container 13. In this manner, the inside of each channel is replaced (cleaned) with a new mobile phase. At this time, the new mobile phase is detected by the detector 12, and a background component is measured. Further, the mobile phase may be evaluated based on the detection result. Note that there may be a function for inquiring the user whether to start the cleaning when the replacement of the container is detected.

In response to the detection of the replacement of the first mobile phase container 6 or the second mobile phase container 8, the history storage processor 307 stores information indicating that the first mobile phase container 6 or the second mobile phase container 8 is replaced and information on the date and time of the replacement of each of the containers in the storage device 44 as a history as the detection information 441 and the date and time information 442 associated with each other (Step S303). Note that, at this time, the execution of the cleaning operation shown in Step S302 and details of the cleaning operation (for example, when the cleaning operation is started, when the cleaning operation is completed, whether the user instructs the cleaning, and the like) may be stored in the storage device 44.

Then, while the analysis operation is performed in the liquid chromatograph 1, the control from Step S301 to Step 303 is repeated. In the liquid chromatograph 1, when the analysis operation ends (YES in Step S304), the control accompanying the above-described container replacement ends.

Note that the container replacement detection processor 302 may detect that the waste liquid container 13 is replaced. Specifically, in the liquid chromatograph 1, when the waste liquid in the waste liquid container 13 increases, the user lifts the waste liquid container 13 and removes the waste liquid in the waste liquid container 13. Then, the user places the waste liquid container 13 in an empty state on the third measuring device 16 again. For this reason, the container replacement detection processor 302 uses the information of the container information 444 (information of the waste liquid container 13) as a reference value, and detects that the waste liquid container 13 is replaced as the weight measured by the third measuring device 16 decreases to the reference value. In this case, similarly to the above, in response to the detection of the replacement of the waste liquid container 13, information indicating that the waste liquid container 13 is replaced, and information on the date and time of the replacement of the waste liquid container 13 are preferably stored in the storage device 44 as the detection information 441 and the date and time information 442 associated with each other by the history storage processor 307.

Note that the configuration may be such that a light emitting element and a light receiving element (light sensor) are installed in the waste liquid container 13, so that light from the light emitting element hits the light receiving element when the waste liquid container 13 does not exist, and the light is blocked when the waste liquid container 13 exists. Then, the replacement of the container may be detected by monitoring the state of the light receiving element.

Further, control for adjusting the opening of the valve provided in the channel may be performed in response to the detection of the replacement of each container as described above.

4. Action and Effect (1) According to the present embodiment, as shown in FIG. 2, the liquid chromatograph 1 includes the weight measuring device 21 and the control device 30. The control device 30 includes a liquid amount detection processor 301. The weight measuring device 21 measures the weight of the first mobile phase container 6, the second mobile phase container 8, or the waste liquid container 13. The liquid amount detection processor 301 detects the amount of the mobile phase or the amount of the waste liquid based on the weight measured by the weight measuring device 21.

For this reason, the amount of the mobile phase or the amount of the waste liquid can be detected without providing a flow sensor or the like in a channel.

As a result, the delivery of the mobile phase can be kept in a smooth state.

Further, even in a case where a problem occurs in the channel of the mobile phase, the first pump 7, and the second pump 9, the amount of the mobile phase or the amount of the waste liquid can be detected. Furthermore, the amount of the mobile phase or the amount of the waste liquid can be detected without being affected by the shape of each container.

For this reason, the amount of the mobile phase or the amount of the waste liquid can be accurately detected.

(2) Further, according to the present embodiment, as shown in FIG. 2, in the liquid chromatograph 1, the control device 30 includes the container replacement detection processor 302. The container replacement detection processor 302 detects that each container is replaced by a method such as monitoring a change in weight measured by the weight measuring device 21 or monitoring the state of the optical sensor.

Therefore, it is possible to automatically detect that each container is replaced with a simple configuration.

(3) Further, according to the present embodiment, as shown in FIG. 2, in the liquid chromatograph 1, the control device 30 includes the liquid delivery processor 303. The liquid delivery processor 303 drives the drive device 41 in response to the replacement of each container (the first mobile phase container 6 or the second mobile phase container 8) detected by the container replacement detection processor 302, and causes each of the first pump 7 and the second pump 9 to be operated for a predetermined time.

For this reason, the mobile phase can be automatically delivered in response to the replacement of each container (the first mobile phase container 6 or the second mobile phase container 8). Then, by causing a new mobile phase to flow through the channel, the channel can be cleaned.

As a result, the operation of cleaning the channel can be automated.

(4) Further, according to the present embodiment, as shown in FIG. 2, in the liquid chromatograph 1, the control device 30 includes the notification processor 304. The notification processor 304 performs notification based on a detection result obtained by the liquid amount detection processor 301. Specifically, in a case where the amount of each mobile phase detected by the liquid amount detection processor 301 is less than the first threshold which is a predetermined set amount (YES in Step S102 of FIG. 3), the notification processor 304 causes the display device 42 to display that the mobile phase is insufficient (Step S103 in FIG. 3). Further, in a case where the amount of the waste liquid detected by the liquid amount detection processor 301 is equal to or more than the second threshold which is a predetermined set amount (YES in Step S202 of FIG. 4), the notification processor 304 causes the display device 42 to display that the amount of the waste liquid is excessive (waste liquid is excessive) (Step S203 in FIG. 4).

For this reason, it is possible to make the user surely recognize the detection result (insufficient mobile phase or excessive waste liquid) obtained by the liquid amount detection processor.

(5) Further, according to the present embodiment, as shown in FIG. 2, in the liquid chromatograph 1, the control device 30 includes the stop processor 305. The stop processor 305 stops the operation of the liquid chromatograph 1 based on the detection result obtained by the liquid amount detection processor 301. Specifically, in a case where the amount of each mobile phase detected by the liquid amount detection processor 301 is less than the first threshold which is a predetermined set amount (YES in Step S102 of FIG. 3), the stop processor 305 stops the drive of the drive device 41 and also stops the operation of the sample introduction device 10 so as to stop the analysis operation (Step S104 in FIG. 3). Further, in a case where the amount of the waste liquid detected by the liquid amount detection processor 301 is equal to or more than the second threshold which is a predetermined set amount (YES in Step S202 of FIG. 4), the stop processor 305 stops the drive of the drive device 41 and also stops the operation of the sample introduction device 10 so as to stop the analysis operation (Step S204 in FIG. 4).

For this reason, in a case where the liquid chromatograph 1 is not in a state suitable for performing the analysis operation, the operation of the liquid chromatograph can be stopped.

(6) Further, according to the present embodiment, as shown in FIG. 2, in the liquid chromatograph 1, the control device 30 includes the history storage processor 307. The history storage processor 307 stores the information indicating that each container is replaced and the date and time information of the replacement in the storage device 44 as a history in response to the detection of replacement of each container by the container replacement detection processor 302. Specifically, in response to the detection of the replacement of each container by the container replacement detection processor 302, the history storage processor 307 stores information indicating that each container is replaced and information on the date and time of the replacement in the storage device 44 as a history as the detection information 441 and the date and time information 442 associated with each other (Step S303 of FIG. 5).

For this reason, the fact that each container is replaced and the information on the date and time of replacement of each container can be stored in the storage device 44 as a history.

As a result, information on the replacement of each container can be appropriately managed.

(7) Further, according to the present embodiment, in a case where the amount of each mobile phase detected by the liquid amount detection processor 301 becomes less than the first threshold which is a set amount determined in advance (YES in Step S102 in FIG. 3), the history storage processor 307 stores information indicating the occurrence of shortage of the mobile phase and information on the date and time of the shortage in the storage device 44 as a history as the detection information 441 and the date and time information 442 associated with each other (Step S105).

For this reason, the fact that the amount of each mobile phase becomes less than the first threshold and information on the date and time of the fact can be stored as a history.

As a result, information on the amount of the mobile phase can be appropriately managed.

(8) Further, according to the present embodiment, in a case where the amount of the waste liquid detected by the liquid amount detection processor 301 becomes equal to or more than the second threshold which is a set amount determined in advance (YES in Step S202 in FIG. 4), the history storage processor 307 stores information indicating the occurrence of excess of the waste liquid and information on the date and time of the shortage in the storage device 44 as a history as the detection information 441 and the date and time information 442 associated with each other (Step S205 of FIG. 4).

For this reason, the fact that the amount of the waste liquid becomes equal to or more than the second threshold and information on the date and time of the fact can be stored as a history.

As a result, information on the amount of the waste liquid can be appropriately managed.

7. Variation

In the above embodiment, the amount of the mobile phase stored in each mobile phase container in a full state is described as being detected by the liquid amount detection processor 301 and stored in the storage device 44. However, the amount of the mobile phase stored in each mobile phase container in a full state may be stored in the storage device 44 in advance. Then, based on this information, the remaining amount of the mobile phase in each mobile phase container may be detected.

Further, in the above embodiment, the notification processor 304 is described as performing the notification by displaying on the display device 42. However, the notification processor 304 may perform the notification by another method such as generating a sound.

DESCRIPTION OF REFERENCE SIGNS 1 liquid chromatograph
6 first mobile phase container
8 second mobile phase container
11 separation column
13 waste liquid container
14 first measuring device
15 second measuring device
16 third measuring device
21 weight measuring device
30 control device
44 storage device
301 liquid amount detection processor
302 container replacement detection processor
303 liquid delivery processor
304 notification processor
305 stop processor
307 history storage processor
441 detection information
442 date and time information

The invention claimed is:

1. A liquid chromatograph that delivers a mobile phase contained in a mobile phase container into a column, separates a sample in the column, and collects the mobile phase that passes through the column in a waste liquid container, the liquid chromatograph comprising:
   a weight measuring device measuring a weight of the mobile phase container; and
   a liquid amount detection processor detecting an amount of the mobile phase in the mobile phase container based on the weight measured by the weight measuring device; and
   a container replacement detection processor that detects that the mobile phase container is replaced,
   wherein the liquid amount detection processor detects the weight of the mobile phase in the mobile phase container and detects the amount of the mobile phase in the mobile phase container, by using information of specific gravity, based on the detected weight and inputted information that identifies one of a plurality of different types of mobile phases in the mobile phase container.

2. The liquid chromatography according to claim 1, wherein the container replacement detection processor detects that the mobile phase container is replaced based on a weight measured by the weight measuring device.

3. The liquid chromatograph according to claim 2, further comprising a liquid delivery processor delivering a mobile phase in the mobile phase container in a case where replacement of the mobile phase container is detected by the container replacement detection processor.

4. The liquid chromatograph according to claim 2, further comprising a history storage processor configured to store information indicating that the mobile phase container is replaced and date and time information of the replacement as a history in a storage device, in a case where the container replacement detection processor detects replacement of the mobile phase container.

5. The liquid chromatograph according to claim 1, further comprising a notification processor for performing notification based on a detection result obtained by the liquid amount detection processor.

6. The liquid chromatograph according to claim 1, further comprising a stop processor configured to stop operation of the liquid chromatograph based on a detection result obtained by the liquid amount detection processor.

7. The liquid chromatograph according to claim 1, further comprising a history storage processor configured to store information indicating occurrence of shortage of a mobile phase and date and time information of the occurrence of shortage as a history in a storage device, in a case where an amount of a mobile phase in the mobile phase container detected by the liquid amount detection processor is less than a first threshold.

8. The liquid chromatography according to claim 1, wherein the container replacement detection processor detects that the mobile phase container is replaced based on a weight measured by the weight measuring device.

9. The liquid chromatography according to claim 1, wherein the container replacement detection processor detects that the mobile phase container is replaced in an analysis.

10. The liquid chromatography according to claim 1, wherein the container replacement detection processor detects that the mobile phase container is replaced based on whether the weight changes so as to decrease once and then increase.

11. The liquid chromatography according to claim 1, wherein the liquid chromatograph further comprises a light emitting element and a light receiving element, wherein the container replacement detection processor detects that the mobile phase container is replaced by monitoring a state of the light receiving element.

12. A liquid amount detection method of a liquid chromatograph that delivers a mobile phase contained in a mobile phase container into a column, separates a sample in the column, and collects the mobile phase that passes through the column in a waste liquid container, the liquid amount detection method comprising:

a weight measuring step of for measuring a weight of the mobile phase container; and
 a liquid amount detecting step of for detecting an amount of a mobile phase in the mobile phase container based on the weight measured by the weight measuring step,
 a container replacement detection step of detecting that the mobile phase container is replaced, in the liquid amount detecting step, the weight of the mobile phase in the mobile phase container is detected, and the amount of the mobile phase in the mobile phase container is detected, by using information of specific gravity, based on the detected weight and inputted information that identifies one of a plurality of different types of mobile phases.

* * * * *